US009520608B2

(12) United States Patent
Becker et al.

(10) Patent No.: US 9,520,608 B2
(45) Date of Patent: Dec. 13, 2016

(54) ENERGY GENERATION SYSTEM AND RELATED USES THEREOF

(71) Applicant: Concurrent Technologies Corporation, Johnstown, PA (US)

(72) Inventors: Mark Becker, Johnstown, PA (US); Michael Pollock, Boswell, PA (US); Michel J. McCluskey, Somerset, PA (US); Daniel R. Markiewicz, Johnstown, PA (US)

(73) Assignee: Concurrent Technologies Corporation, Johnstown, PA (US)

( * ) Notice: Subject to any disclaimer, the term of this patent is extended or adjusted under 35 U.S.C. 154(b) by 58 days.

(21) Appl. No.: 14/209,084

(22) Filed: Mar. 13, 2014

(65) Prior Publication Data

US 2014/0193731 A1    Jul. 10, 2014

Related U.S. Application Data

(63) Continuation-in-part of application No. 13/841,760, filed on Mar. 15, 2013, now Pat. No. 8,968,948.

(Continued)

(51) Int. Cl.
*C02F 1/00* (2006.01)
*C02F 1/32* (2006.01)
(Continued)

(52) U.S. Cl.
CPC ........... *H01M 8/065* (2013.01); *H01M 8/0656* (2013.01); *H01M 16/003* (2013.01);
(Continued)

(58) Field of Classification Search
CPC .. H01M 8/065; H01M 8/0656; H01M 16/003; H01M 16/006; H01M 2008/1095; H01M 2250/407; C02F 1/469; C02F 1/32; C02F 1/441; C02F 2103/08; C02F 2201/009; C02F 1/00; Y02E 10/70; Y02E 10/76; Y02E 10/766; Y02E 10/763; B01D 61/025; B01D 61/06; B01D 61/12; B01D 2311/04; B01D 2313/365
See application file for complete search history.

(56) References Cited

U.S. PATENT DOCUMENTS 4,025,697 A     5/1977  Hart
6,962,053 B2 *  11/2005 Gebel ...................... F03D 9/00
                                                              60/398

(Continued)

FOREIGN PATENT DOCUMENTS

WO           8911165         11/1989

OTHER PUBLICATIONS

Notification of Transmittal of the International Search Report and the Written Opinion of the International Searching Authority, International Search Report and Written Opinion of the International Searching Authority for PCT/US2013/042208, dated Dec. 19, 2013 (13 pages).

*Primary Examiner* — Gregg Cantelmo
(74) *Attorney, Agent, or Firm* — Buchanan Ingersoll & Rooney PC

(57) ABSTRACT

A system for converting a waste stream to energy including a water purification device that outputs purified water and a waste stream that includes an electrolyte, a wind and electrolytic energy generation device that receives the waste stream from the water purification device and outputs energy based on the electrolyte present in the waste stream and a power distribution system which receives and stores the energy from the wind and electrolytic energy generation device. The water purification device is further connected to the power distribution system and receives energy enabling further operation of the water purification device.

14 Claims, 9 Drawing Sheets

Related U.S. Application Data

(60) Provisional application No. 61/650,190, filed on May 22, 2012.

(51) Int. Cl.
*C02F 1/44* (2006.01)
*B01D 61/06* (2006.01)
*B01D 61/12* (2006.01)
*H02N 3/00* (2006.01)
*H01M 16/00* (2006.01)
*H01M 8/06* (2016.01)
*H01M 8/10* (2016.01)
*C02F 103/08* (2006.01)

(52) U.S. Cl.
CPC ............ *H01M 16/006* (2013.01); *H02N 3/00* (2013.01); *C02F 1/32* (2013.01); *C02F 1/441* (2013.01); *C02F 2103/08* (2013.01); *C02F 2201/009* (2013.01); *H01M 2008/1095* (2013.01); *H01M 2250/407* (2013.01); *Y02E 60/50* (2013.01); *Y02E 60/563* (2013.01)

(56) References Cited

U.S. PATENT DOCUMENTS

| | | | |
|---|---|---|---|
| 8,421,047 | B2 | 4/2013 | Carmein et al. |
| 8,502,181 | B2 | 8/2013 | Carmein et al. |
| 8,502,507 | B1 | 8/2013 | White et al. |
| 2003/0138675 | A1 | 7/2003 | Cibuzar |
| 2005/0183964 | A1 | 8/2005 | Roberts et al. |
| 2008/0230376 | A1 | 9/2008 | Brauns |
| 2009/0218910 | A1* | 9/2009 | Carmein .............. H02K 57/003 310/309 |
| 2009/0324997 | A1 | 12/2009 | Tsuji |
| 2012/0111800 | A1 | 5/2012 | Collins |
| 2013/0008315 | A1* | 1/2013 | White ...................... H02N 3/00 96/52 |
| 2013/0015257 | A1* | 1/2013 | Kalra ...................... H02N 3/00 239/3 |

* cited by examiner

ENERGY GENERATION SYSTEM AND RELATED USES THEREOF

CROSS-REFERENCE TO RELATED APPLICATIONS

This application is a continuation-in-part of U.S. patent application Ser. No. 13/841,760, filed on Mar. 15, 2013 (now U.S. Pat. No. 8,968,948), which application claims the benefit of U.S. Provisional Patent Application No. 61/650,190, filed on May 22, 2012, the entire disclosures of which are incorporated by reference herein.

FIELD OF THE INVENTION

The present invention relates to energy generating systems, methods of use and applications thereof. More particularly, embodiments of the present invention relate to energy generation systems using the otherwise waste electrolytic solution resulting from a water purification or distillation process. Even more particularly, embodiments of the present invention relate to energy generation systems using the otherwise waste electrolytic solution resulting from a water purification or distillation process as an input to an electro-hydrodynamic wind energy generation system.

BACKGROUND OF THE INVENTION

Energy is a critical component of modern society and is typically considered a necessity for health, hygiene, communication and as such is required for most devices and applications. In most environments, energy is generally readily available for use as required. However, there are many instances in which the required energy is not readily available, such as in highly populated areas, remote geographic areas, austere environments, impoverished regions, disaster areas, and so on. These areas are typically referred to as "off the grid" regions and require access to alternate means to satisfy their energy requirements, such as batteries, generators, renewable energy, and the like. Unfortunately, each of these sources has its inherent disadvantages. For example, batteries are heavy and have limited operational life. Generators require fossil fuel, have significant thermal and acoustic signatures, are expensive, and also have a significant logistics impact. Renewable energy (e.g., solar) often cannot provide continuous, uninterrupted energy. As such, an energy generating device capable of operating without batteries, generators and/or renewable energy would be beneficial, especially in remote environments where it is difficult and/or impracticable to transport the consumable items needed for energy generation.

Similar to the above-mentioned situations in which access to energy may be limited, access to purified, potable water, in situ, continues to face similar challenges in remote locations. For example, current conditions at military bases require the transport of large amounts of water for both drinking and other uses. Currently, drinking water is frequently provided as bottled water and water for other uses, such as laundry and cleaning, is transported to the military base via convoys. This approach of providing water to military personnel not only proves to be cost-inefficient but is also considerably risky, as it requires the use of personnel for transport, thereby taking those individuals away from the mission. Further, a gallon of water is approximately 8 pounds in weight and depending on the size of the team operating in the remote environment (and the expected duration of the mission); the total amount of water required can be of a substantial weight. In a military application where the team often reaches its site by foot, any additional weight can be a highly problematic strain.

Accordingly, it would be beneficial to have a water purification device that is configured to purify water without the need for a generator, fossil fuels or other cumbersome technologies.

The present invention is directed toward overcoming one or more of the above-mentioned problems.

SUMMARY OF THE INVENTION

As disclosed herein, a system for converting a waste stream to energy comprises a water purification device that outputs purified water and a waste stream that includes an electrolyte, a wind and electrolytic energy generation device that receives the waste stream from the water purification device and outputs energy based on the electrolyte present in the waste stream and a power distribution system which receives and stores the energy from the wind and electrolytic energy generation device. In addition, the water purification device is further connected to the power distribution system and receives energy enabling further operation of the water purification device.

In another preferred embodiment, the wind and electrolytic energy generation device separates positively charged ions and negatively charged ions from the waste stream and collects at least one of the negatively charged ions and the positively charged ions.

In yet another preferred embodiment, the system further comprises a galvanic battery that receives a portion of the waste stream from the water purification device and outputs energy based on a reduction-oxidation reaction occurring between a metal in the galvanic battery and the electrolyte present in the waste stream.

In yet another preferred embodiment, the system further comprises a hydrogen fuel cell configured to collect hydrogen produced as a byproduct of the reduction oxidation reaction occurring in the galvanic battery.

In a further preferred embodiment, the hydrogen fuel cell comprises a hydrogen polymer exchange membrane configured to utilize the collected hydrogen to produce electricity.

In still a further preferred embodiment, the hydrogen fuel cell comprises a hydrogen regulation system configured to prohibit the collected hydrogen from flowing back into the galvanic battery.

In another preferred embodiment, the system further comprises a combustion burner configured to bum the collected hydrogen to produce heat energy.

In still another preferred embodiment, the system further comprises a salinity monitor configured to measure a salinity of the waste stream.

In yet another preferred embodiment, the system further comprises a salt adding device configured to produce a saline electrolyte solution of a predetermined salinity.

In a further preferred embodiment, the wind and electrolytic energy generation device comprises a collector and an adjustable height component.

In still a further preferred embodiment, the system further comprises an ultraviolet purifier configured to perform bacterial purification and a chiller unit configured to maintain the purified water at a predetermined temperature.

In yet a further preferred embodiment, the system further comprises an external power interface configured to connect the system to an external power source for drawing energy into the system.

In another preferred embodiment, the system further comprises a pump device configured to circulate the electrolyte generated by at least one of the water purification device and a salt adding device through the wind and electrolytic energy generation device.

In yet another preferred embodiment, the wind and electrolytic energy generation device separates positively charged ions and negatively charged ions from the waste stream via an electrical field.

Also as disclosed herein a method for converting a waste stream to energy comprises receiving a water source by a water purification device, outputting, by the water purification device, purified water and a waste stream that includes an electrolyte, receiving, by a wind and electrolytic energy generation device, the waste stream from the water purification device, generating energy, by the wind and electrolytic energy generation device, based on the electrolyte present in the waste stream, receiving the energy from the wind and electrolytic energy generation device by a power distribution system and storing energy generated by the wind and electrolytic energy generation device by the power distribution system. Further, the water purification device is further connected to the power distribution system and receives energy enabling further operation of the water purification device.

In another preferred embodiment, the wind and electrolytic energy generation device separates positively charged ions and negatively charged ions from the waste stream and collects at least one of the negatively charged ions and the positively charged ions.

In another preferred embodiment, the method further comprises receiving at least a portion of the waste stream from the water purification device by a galvanic battery that outputs energy based on a reduction-oxidation reaction occurring between a metal in the galvanic battery and the electrolyte present in the waste stream.

In still another preferred embodiment, the wind and electrolytic energy generation device comprises a collector and an adjustable height component.

In a further preferred embodiment, the wind and electrolytic energy generation device generating energy comprises the wind and electrolytic energy generation device separating positively charged ions and negatively charged ions from the waste stream via an electrical field.

In still a further preferred embodiment, the method further comprises measuring a salinity of the waste stream by a salinity monitor.

It is an object of the present invention to provide a water purification system integrating waste electrolyte into an electrolytic-driven energy generation system.

Other objects, aspects and advantages of the present invention can be obtained from a study of the specification, the drawings, and the appended claims.

BRIEF DESCRIPTION OF THE DRAWINGS

A more complete appreciation of the disclosed embodiments and many of the attendant advantages thereof will be readily obtained as the same becomes better understood by reference to the following detailed description when considered in connection with the accompanying drawings, wherein.

DETAILED DESCRIPTION OF THE INVENTION

Figure 1:
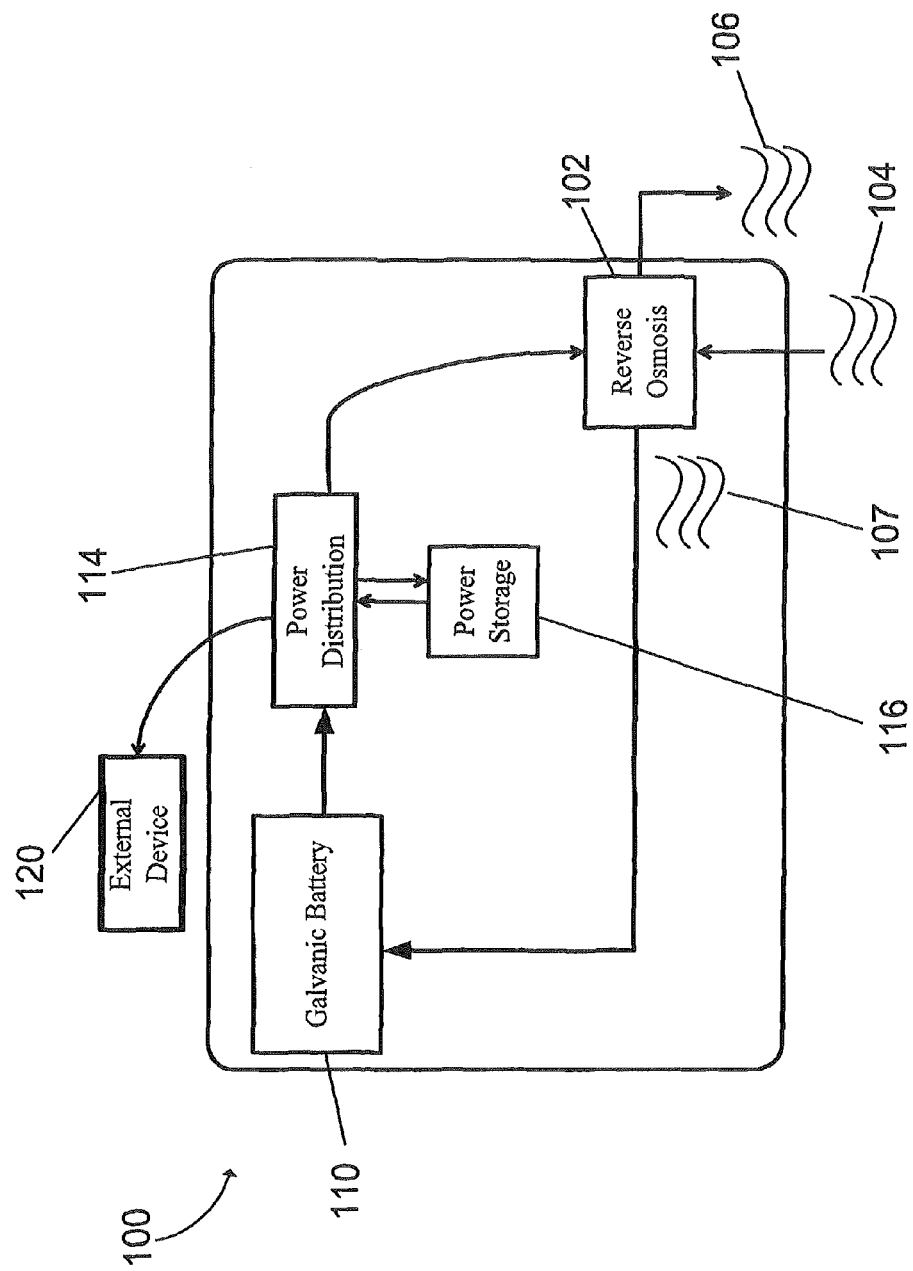
FIG. 1 is a schematic representation of a water purification system incorporating an electrolytically-driven galvanic battery according to one embodiment of the invention.

Embodiments disclosed herein relate to an apparatus and method for energy generating system that is configured to generate energy without the use of fossil fuels, generators, external batteries or the like. The energy generation system will be described in context of a water purification system, wherein the energy generating system provides the required amount of energy to perform the water purification process.

According to one embodiment of the invention, an energy generating system comprises one or more galvanic cells using an electrolytic solution for generating energy. As will be more fully described herein, the energy generating system of the present embodiment of the invention overcomes the disadvantages associated with conventional energy generation technology, by requiring only an electrolyte to drive energy generation. In contrast, conventional technologies usually require fossil fuels, or similar to drive energy generation. By eliminating the need for these sources, a compact and easily transportable energy generation system is realizable in remote environments otherwise ill-suited to the logistics demands conventional systems impose.

The energy generation system will now be discussed in the context of a water purification system, wherein the energy generation system provides the required amount of energy for successfully implementing the water purification operation. However, it is to be appreciated that this discussion is intended to facilitate a more thorough understanding and illustration of the energy generation system, and should not be read as to circumscribe its applicability. To the contrary, there are many contemplated applications for the energy generation system, not all of which include water purification. Additional and alternative applications and embodiments will be more fully described herein.

In an example application, the galvanic battery of the present embodiment of the invention can be adapted for use in connection with a water purification system. Water purification systems, especially those employing reverse osmosis (RO) units, require an energy source to drive the RO-based water purification. For example, a small mobile RO unit requires a 5 kW generator to function, thereby producing a significant level of noise and heat signature and also requires constant maintenance. In the present embodiment of the invention, the galvanic battery can provide the energy necessary to power the water purifier system, thus providing an advantage over conventional approaches requiring fossil fuel and/or renewable energy sources. Further, a RO unit outputs purified water and a waste stream (electrolytes). If the input to the RO unit is an electrolytic solution, such as seawater, the waste stream will also be electrolytic, such as a brine solution. Normally this waste stream is discarded as waste. However, the galvanic battery of the present embodiment is configured to translate this waste into energy, which in turn can be directed back to the RO unit for continued operation. Additionally, depending on the configuration of the system, the galvanic battery may produce more energy than is required to drive the RO unit, this excess energy can be stored and/or exported for use by external devices. Thus, in an example application, the present embodiment provides a self-contained system able to purify water, automatically generate the energy necessary for the water purification, and additionally generate excess energy that can be used to power external devices, all without necessarily relying on generators, fossil fuels and/or renewable energy sources.

Turning to FIG. 1, illustrated is a schematic representation of a water purification system 100 employing the galvanic battery energy source according to an embodiment of the invention. The system 100 preferably includes a reverse osmosis (RO) unit 102, a galvanic battery 110, and a power distribution system 114. In operation, the RO unit 102 draws in a water source 104, such as brackish water, seawater or the like and produces purified water 106, and passes the waste stream 107, to the galvanic battery 110. Upon contact with the waste stream (i.e., an electrolyte), the galvanic battery 110 produces energy and transfers it to the power distribution system 114, which makes the energy available to the RO unit 102 for continued operation. A discussion of each of the example elements of FIG. 1 will follow.

The RO unit 102 can be any device capable of purifying water, including forward osmosis, charcoal, simple filtration and the like. The RO unit is a membrane technology-based filtration method that removes particles and other elements from solutions by applying pressure to the solution when it is on one side of a selective membrane. The RO unit can be variously combined with other technologies as applications dictate, such as one or more sediment filters (optionally with varying pores sizes), activated carbon filters, ultra-violet (UV) lamps for disinfecting any microbes, sea water-specific elements, and so on. It is to be understood that any solution exhibiting electrolytic properties can be used in connection with the present embodiment of the invention. For example, suitable solutions include salt water, brine, runoff, mineral water, urine, any Chloride (XX-CL), and so on.

Turning now to the galvanic battery 110, the battery 110 is any device capable of generating a galvanic reaction in the presence of an electrolyte. A galvanic battery, also known as a galvanic cell or voltaic cell, is an electrochemical cell that derives electrical energy from a reduction-oxidation (redox) reaction occurring between different metals in the presence of an electrolyte. Metals for such galvanic batteries are often selected with reference to a galvanic series table, i.e., the potential they develop in an electrolyte, along with application parameters.

The coupling of a galvanic battery with a RO unit provides certain advantages. For example, in an RO operation using a chloride-containing water as a source, brine reject is produced as a byproduct of the water purification operation. This reject is often discarded on creation. However, when the RO unit is coupled to a galvanic battery, as described above, the brine reject is an essentially free electrolyte able to drive the galvanic battery 110 and produce energy.

In a preferred embodiment, the galvanic battery 110 is a magnesium-carbon (MagC) battery. Further to the energy production aims, the significant galvanic difference between magnesium and carbon provide for high energy density, particularly relative to conventional batteries. More specifically, a conventionally high energy density battery, such as a lithium polymer battery, has an energy density of approximately 400 watt-hours/Kg. In contrast, a MagC battery displays an energy density of approximately 1600 watt-hours/Kg, which represents a 4× energy increase at approximately a one-quarter of the mass of a comparable lithium polymer battery. In applications where weight is a concern, such as expeditionary applications (e.g., military operations), the MagC battery provides significant weight advantages without a corresponding energy tradeoff.

MagC batteries may be used in marine environments due to the abundance of seawater electrolyte that provides the approximately 2% salinity MagC batteries require for operation. However, as will be shown below, the galvanic battery 110 can be used in any environment with certain modifications that provide for the ready supply of a sufficient electrolyte. The presence of an electrolyte causes the magnesium (or any other suitable metal/anode) to galvanically corrode, and thereby produce energy that is captured by the power distribution system 114 (to be discussed). Further, MagC operation also produces magnesium hydroxide (Mg(OH)2) as a by-product. Magnesium hydroxide (also known as milk of magnesia) is a generally inert compound ideally flushed (actively or passively) from the battery, and various modifications may be made to facilitate the steady removal of magnesium hydroxide from between the selected anode and cathode so as to minimize disruption to electrical generation. The magnesium hydroxide may suitably be discarded or retained for alternate applications. In what follows, there is first described a configuration of the MagC battery and then described the power distribution system of the present embodiment of the energy generating system.

Figure 2A:
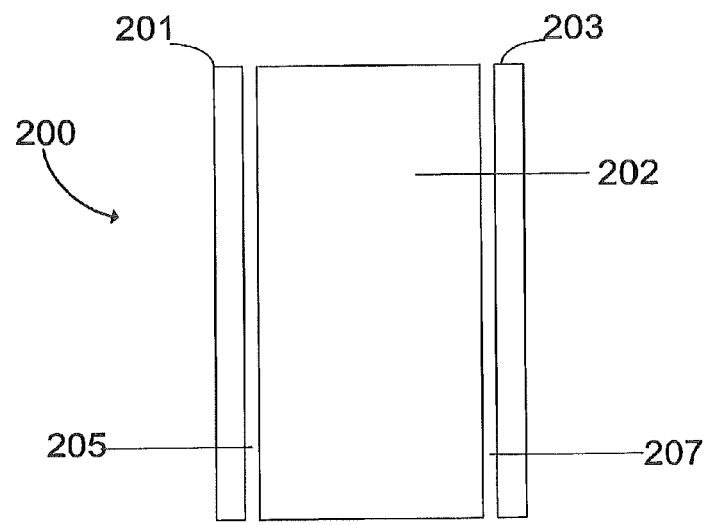
FIG. 2A depicts a configuration of a double-sided MagC battery and FIG. 2B represents a stack of MagC batteries.

FIG. 2A depicts the configuration of a double sided MagC battery 200. The MagC battery is predicated upon a galvanic reaction (or difference in potential electric charge) between two dissimilar materials. Referencing the galvanic series, the two most dissimilar materials are magnesium and carbon. Magnesium (the anode of the battery) 202, corrodes when placed in an electrolyte solution with a cathode material, such as carbon (cathodes 201 and 203). During the corrosion (oxidation reaction), electrons are free to move from the cathode to the anode. Further, if connected together in a circuit, energy can be extracted from the corrosion of the anode in the form of direct current electricity. Specifically, the chemical reaction governing the operation of a MagC battery can be represented as:

$$Mg + 2H_2O \rightarrow Mg(OH)_2 + H_2 \quad \text{(Eq. 1)}$$

While magnesium, in general, is considered as the anode material of the MagC battery, different alloys of magnesium could be used as anodes. For example, the magnesium alloy AT61 offers a performance of 30 milli-amperes (mA) per $cm^2$ of current density. Further, while AT61 is the magnesium alloy is used in the example, alloys such as AZ31B, AZ 61 and AZ91D can also be used. The cathode material of the MagC battery is a carbon based cathode, referred to as carbon based air cathode 201 and 203. The air cathode can further be catalyzed with other elements that support the magnesium/carbon reaction of (Eq. 1).

In order to generate the optimum amount of power, the cell design as represented in FIG. 2A, is double sided (i.e., including a single anode in the center of the cell and 2 air cathodes on both sides). This design allows the cell to generate electricity from both sides of the anode and provides higher current than a corresponding single sided design which includes a single cathode and a single anode arrangement. Further, the double-sided design of the MagC battery also aids in the flow of the electrolyte around the cell to remove the magnesium hydroxide byproduct. However, a single sided design may also be used.

Figure 2B:
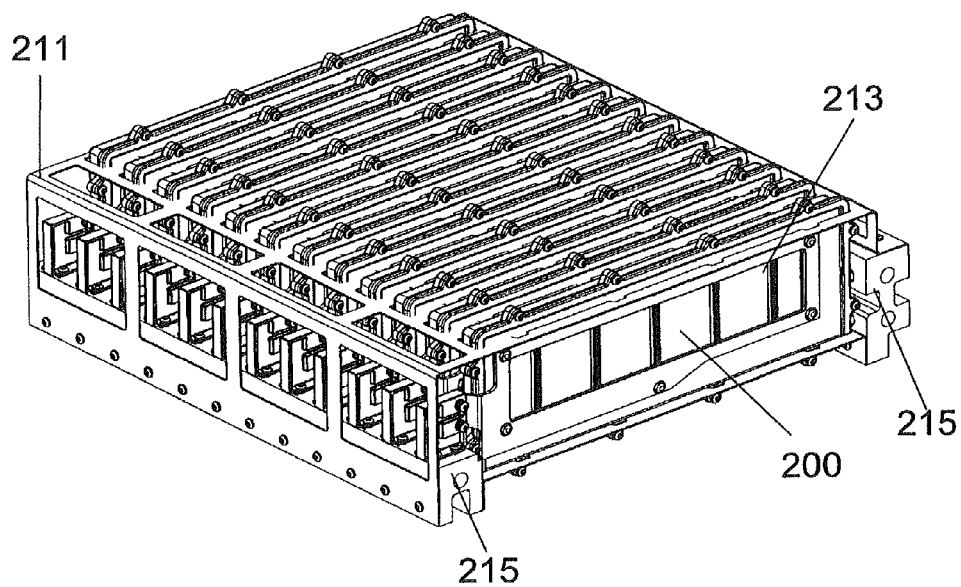

FIG. 2B represents a stack of MagC batteries that can be used as the galvanic battery 110 in the embodiment of FIG. 1. A frame 211 (made of acrylonitrile butadiene styrene (ABS)) and a cathode support 213 (of acrylic plastic) provide the required support to each of the MagC battery. Further, a pair of base plates 215 are provided to maintain the stack of MagC batteries in position. Alternatively, a single base plate can be used to support the support the stack of MagC batteries. The frame design as depicted in FIG. 2B allows for the anode to be easily removed and replaced for refueling purposes. The number of cells in a particular stack are dependent on the design parameters of the energy generating system. For example, a stack with 24 MagC batteries wired in series, provides a 1.2 VDC and approximately 25 A current per battery. This corresponds to approximately 4.2 kWh of stored 10 energy in the anode of each battery.

Specifically, the magnesium component of the MagC battery is a consumable item due to its gradual corrosion, and each cell is able to produce a generally fixed amount of energy based on the overall size and other relevant parameters of the actual cell. As a given cell cannot produce energy indefinitely, the limited life has implications to the overall system 100 design with particular regard to the amount of energy required by users of the system 100. As previously mentioned, one application of the water purification system 100 is to support expeditionary activity, such as a team of soldiers executing a mission autonomously in an austere environment. The parameters of these missions are often predetermined, such as the overall mission duration (e.g., 10 days) and the number of soldiers constituting the team. Once the parameters are understood (e.g., the number of soldiers, the mission duration, how much water per day per solider is required, and the amount of energy required to produce a unit of water, etc.), the system 100 can be appropriately constructed to contain any number of MagC batteries necessary to produce the required quantity of energy.

Further, the limited life of a galvanic battery also impacts overall system 100 lifecycle considerations. For example, there may be applications in which single system 100 use (e.g., use until the system 100 is no longer able to generate electricity) is acceptable, with the system 100 being disposed of on expiration. The system 100 can also be configured to have modular galvanic batteries 110, in a "plug and play" like manner, removable from the system 100 (as shown in FIG. 2B) on expiration and replaceable with fresh batteries 110. In one approach, the system 100 is configured conceptually similar to an ink-jet printer such that an average user (i.e., not necessarily a maintenance operator) can easily remove and replace the consumable item with ease.

Turning now to the power distribution system 114 of FIG. 1, the power distribution system 114 is provided as any means, such as a common bus, able to connect to an energy source and transmit power to select components. In connection with the water purification system 100, the power distribution system 114 connects the galvanic battery 110 with the RO unit 102, permitting the transmission of energy there between.

The system 100 may include one or more power storage devices 116 connected to the power distribution system 114 or to another suitable system 100 element. The power storage device 116, such as a conventional battery (e.g., lead acid, lithium ion, lithium polymer, etc.) may be used to store energy generated by the MagC battery 110. The power storage device 116 may store excess energy, i.e., quantities of energy present in the system 100 beyond that required to power the RO unit 102. Further, the storage device 116 is able to make energy stored therein available to the system 100 as required, or to an external device 120, such as laptops, external battery pack, communication equipment or the like.

According to another embodiment of the present disclosure, the energy generating system may comprise a proton exchange membrane (PEM) hydrogen fuel cell. As is described previously, the oxidation reaction while employing a MagC battery results in hydrogen gas as a by-product. Accordingly, this hydrogen gas may be utilized in an additional fuel cell to generate more energy.

Figure 3:
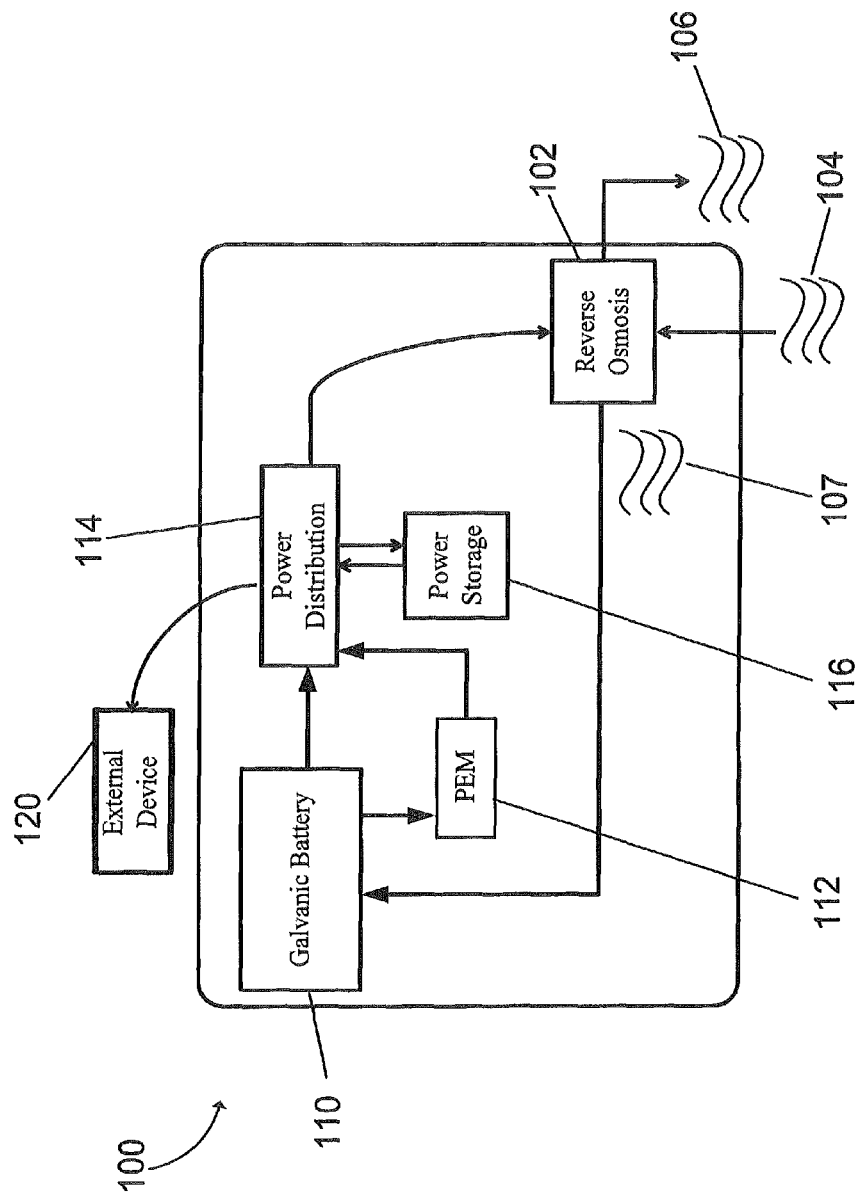
FIG. 3 is a schematic representation of a water purification system according to another embodiment of the disclosure incorporating a hydrogen fuel cell coupled with the galvanic battery.

Specifically, as shown in FIG. 3, the galvanic battery 110 may be associated with one or more other fuel cells to increase the level of energy produced. In connection with the example of the battery 110 provided as a MagC battery, the additional fuel cell(s) may suitably include one or more proton exchange membrane (PEM) fuel cells 112. PEM fuel cells are able to generate electrical energy from hydrogen gas, which is one of the byproducts of the MagC oxidation reaction. Any suitable means can be employed for capturing the hydrogen gas output from the battery 110 and introducing the hydrogen gas into the PEM fuel cell, such as various approaches to humidity adjustment, etc. Further, the PEM cell can include a hydrogen regulation system that comprises valves and ensures that the captured hydrogen does not seep back into the MagC battery. Accordingly, coupling a PEM fuel cell with the MagC battery provides a use for an otherwise discarded product ($H_2$), and also increases system efficiency by generating additional energy. Further, the PEM cell can include a combustion burner (such as a standard orifice type burner), suitable for burning the collected hydrogen to produce heat energy. It is to be appreciated that any two different types of fuel cells or batteries can be used together, where an output of one cell is able to be used by the second fuel cell for energy generation.

Other approaches can be taken to recycle the generated hydrogen gas. For example, the hydrogen gas can be exported to various external devices able to use hydrogen gas as fuel, such as a burner, cooking device, heater, and the like.

Figure 4:
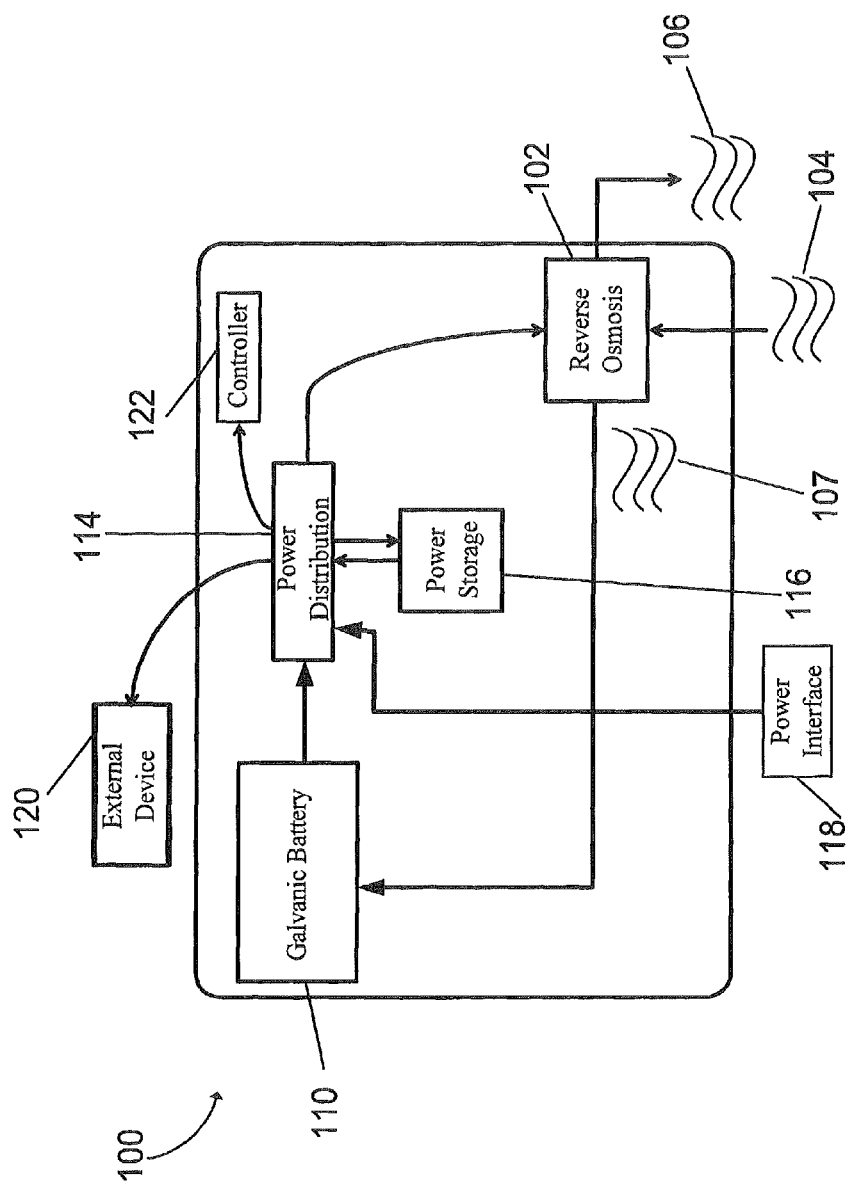
FIG. 4 is a schematic representation of a water purification system according to another embodiment of the disclosure incorporating a controller and an external power source.

According to another embodiment of the present disclosure, the energy generating system may comprise a controller 122 and an external power interface as shown in FIG. 4. The system includes a controller 122 for controlling and/or regulating operation of the device. Such a controller may include a programmable logic controller (PLC) or other microprocessor capable of being programmed to ensure system 100 operation according to a predetermined number of parameters. Also utilized by the controller may be computer readable media such as memories or other logic circuitry. For example, the controller may dictate that, at system startup, waste (i.e., electrolyte) flows from the RO unit 102 at a relatively higher rate so as to minimize galvanic battery 110 downtime immediately following system 100 startup. The controller may further dictate that once the galvanic battery 110 is sufficiently immersed within the electrolyte, the waste flow is reduced to a relatively lower steady rate. Additionally, the controller may provide for a galvanic battery 110 drain sequence to remove electrolyte from the battery 110 upon certain predetermined states being achieved. These adjustments to flow rates may be mediated by various valves or similar mechanisms. Further, the controller may be configured to control a pump which circulates the generated electrolytes within the galvanic battery.

The controller 122 may also be configured to monitor and record system 100 performance. For example, certain levels of activity may be pre-determined as optimal for each system 100 element, such as the RO unit 102 producing a certain volume of reject. The controller 122 may also be configured to monitor such performance and adjust the system 100 as necessary (e.g., opening/closing various valves, stopping RO unit 102 operation, and the like). Further, the controller 122 may monitor and store system 100 performance, such as the amount of energy produced, runtime, the amount of water purified, the amount of energy exported from the system 100, and so on. Further, the controller 122 may include various hardware elements for computing and visually displaying system 100 relevant information, such as an amount of life left in the galvanic battery 110, a level of energy stored in the system 100, and so on. The controller 122 may determine battery 110 life through any suitable means, such as measuring the battery's 110 voltage, through appropriate algorithms that forecast battery life, and the like. The controller's visual display may be provided as any suitable device capable of providing visually-observable information, such as an indicator light, a gauge, an electronic screen, and the like.

The feature of indicating system 100 remaining life offers certain benefits. Returning to the expeditionary mission example, the remaining life information may inform the mission team whether they are over or under-utilizing the system 100, and thereby enable the team to adjust their usage accordingly. Further, the expeditionary mission team may determine, for various reasons, that it's originally planned, e.g., 10 day mission, now needs to be extended to, e.g., 20 days. As such, the team can use remaining life information to ration their use of the system 100 to support the extended duration. In another example, if the expeditionary team returns to its home base after completing the mission and the system 100 indicates the there is life remaining, the system can be used a second time by a team having a mission corresponding to the remaining life.

Further, the power storage unit 116 may optionally be pre-charged and may contain energy stored for the first use of the system 100. As stated previously, the RO unit 102 and the galvanic battery 110 operate in a loop where RO-generated waste provides the electrolyte required by the galvanic battery 110 to generate energy. In the system's 100 first usage, the battery 110 may not have been able to generate the energy required to drive the RO unit 102. Accordingly, the power storage device 116, if pre-charged, can provide the priming energy necessary to operate the RO unit 102, which in turn enables the galvanic battery 110 to begin powering the RO unit 102 itself.

The system 100 may include an external power interface 118, such as a conventional plug. Such an interface 118 may provide a number of functional benefits. For example, the interface 118 may enable the system 100 to connect to an external energy source (e.g., generator, conventional battery, vehicle battery, conventional energy source, etc.) for drawing additional energy into the system 100. Such additional energy may be beneficial in the event the system 100 does not have a sufficient initial charge, the galvanic battery 110 is inoperable, or as other conditions dictate.

The external power interface 118 also provides a means for exporting energy to a device external to the system 100. As previously mentioned, the system 100 is preferably able to generate more energy than the RO unit 102 requires and store the excess energy. This energy can be exported to external devices that have a requirement for energy, such as rechargeable batteries, various electronic devices (e.g., computers) and the like. The interface 118 may also include an integrated DC to AC inverter.

Figure 5:
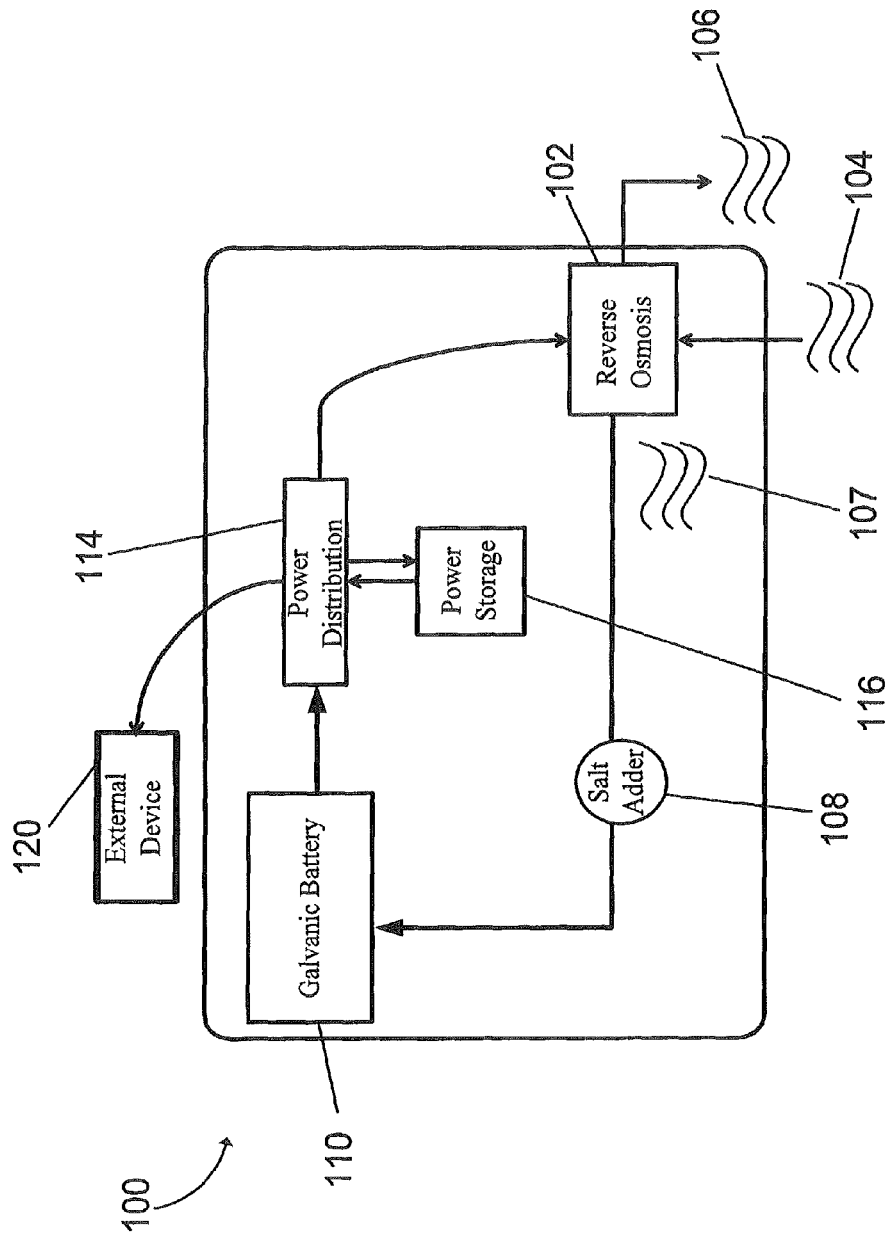
FIG. 5 is a schematic representation of a water purification system according to another embodiment of the disclosure incorporating a saline input unit.

FIG. 5 depicts another embodiment of the present disclosure wherein the system 100 includes a mechanism for adding salt (or similar compound), to the electrolyte 107 provided the by RO unit 102. As previously stated, the galvanic battery 110 requires an electrolyte to operate. In the water purification system 100, the electrolyte is provided by the RO unit 102. However, there are circumstances in which additional salt may be required. For example, if the system 100 is deployed in a purely fresh water environment, the salt adder 108 can generate the brine (electrolyte) otherwise not generated by the RO unit 102.

The salt adder 108 is preferably any device capable of providing a salt to the galvanic battery 110. In one embodiment, the salt adder 108 is a generally cylindrical device having an entrance port (for receiving the reject from the RO unit 102), an exit port (for directing salinated water to the battery 110), and a cavity in which a salt is deposited and through which water circulates to become salinated. In one approach, the entrance port may be situated relatively lower than the exit port, or even laterally offset therefrom (to spur cyclonic fluidic movement), to increase the residence time of water circulating through the adder 108 and thereby increase the water's salinity. Further, the salt adder 108 may include various means for increasing the water's rate of salination, such as a mechanical perturbator, a heater, and so on.

The salt adder 108 may be a refillable container or be provided pre-loaded for one time use. Further, the amount of salt required is dependent on the system's 100 parameters. In the MagC battery 110 example, MagC uses approximately 2% salinity in operation. With this information, coupled with flow rate, the adder 108 dimensions, and the system 100 run duration, etc., the amount of salt required by the system 100 can readily be determined and loaded into the adder 108 or be indicated as requiring loading of the determined amount.

The salt adder 108 may be configured to actuate as necessary. For example, the system 100 may include a salinity sensor that causes RO unit 102 reject to pass through the adder 108 if the sensor determines the reject requires additional salinity. The system 100 may also include a bypass valve that permits the reject to bypass the adder 108 if sufficient salt is already present. Additionally, the adder 108 bypass may be user-actuable if the user were to determine, for various reasons, that additional salt is not required.

Further, the salt adder 108 also provides a mechanism for starting the system 100 for first use. As previously mentioned, the loop between the RO unit 102 and the battery 110 may require an initial source of energy to start the system. Such energy may be provided by the storage device 116 being pre-charged. In an alternate approach, a user could inject water directly into the salt adder 108, bypassing the RO unit 102, which would then force salinated water (i.e., electrolyte) into the battery 110, and thereby enable the battery 110 to generate energy for powering the RO unit 102.

It must be appreciated that the above described embodiments are in no way limiting the scope of the present invention. Various combinations of the embodiments may be adopted to perform the energy generation function. Additional elements can be added to the system 100 and/or battery 110 to increase its energy-generation potential. For example, one or more solar panels or other renewable energy-related source may be coupled to the system 100 and/or battery 110 to generate additional energy.

Figure 6:
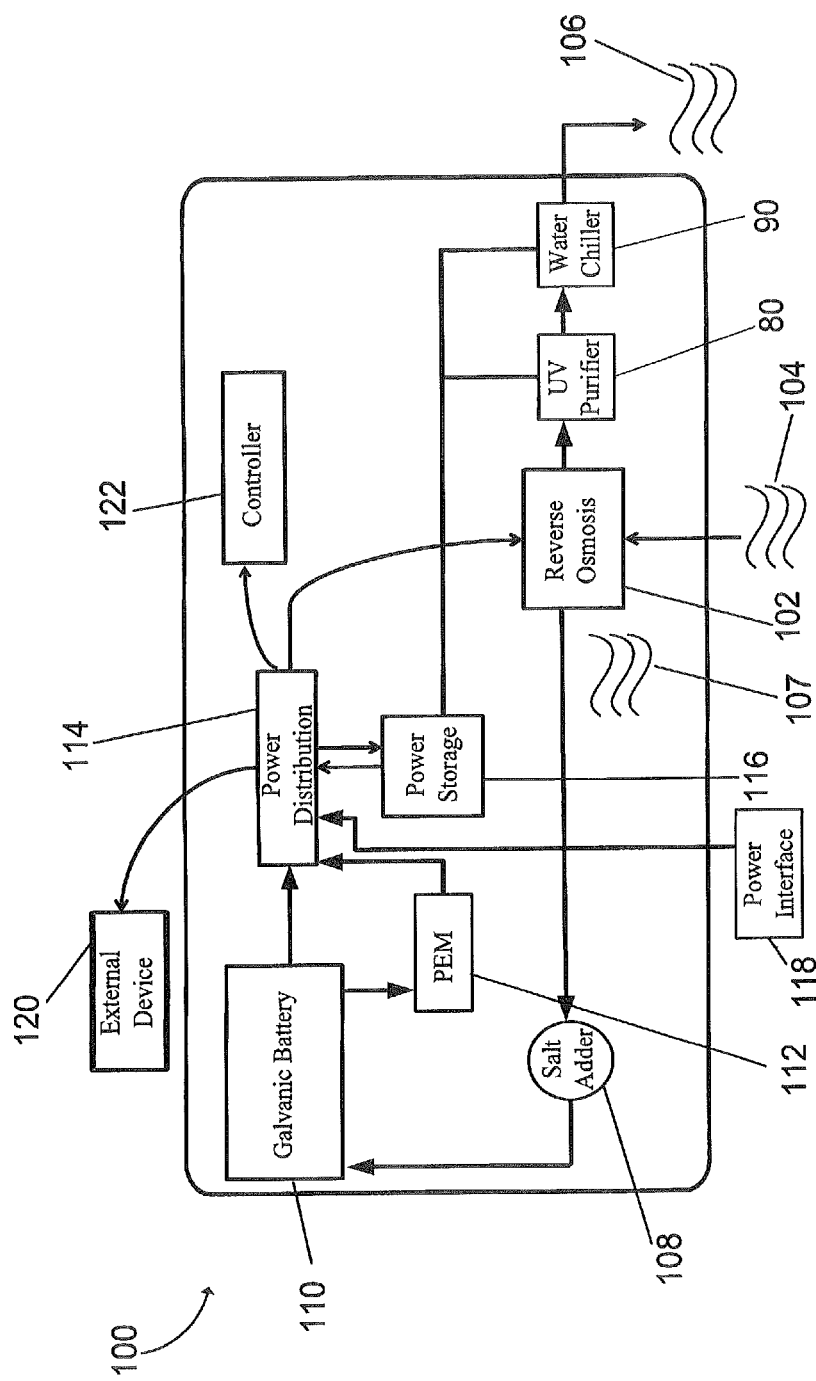
FIG. 6 is a schematic representation of a water purification system according to another embodiment of the disclosure incorporating a UV purifier and a water chiller.

Accordingly, as shown in FIG. 6, the water purifying system 100 may also include an ultra-violet (UV) purifier 80 and a water chiller 90. The UV purifier is configured to provide further purification of water, for example bacterial/microbial purification by utilizing ultraviolet light. A miniature chiller 90 may also be used to keep the clean water generated by the RO unit 102 and further purified by the UV purifier 90 in a cold state.

As is clear from the foregoing discussion of the example water purification system 100, the system 100 offers significant benefits over conventional water purification and/or energy generation technology. For example, generators are commonly available technology for generating energy in remote environments. However, generators have several disadvantages. For example, they require fossil fuel to operate. In a military application, this requires the user(s) to transport sufficient amounts of fuel to operate the generator to a remote location, significantly increasing the weight/logistics burden on the unit. Additionally, fuel is expensive, non-renewable and otherwise problematic. In contrast, the system 100 is adapted to leverage a galvanic reaction as an energy source (instead of a fossil fuel), and rely on a potentially vast electrolyte to drive the reaction. This provides significant weight, cost and logistics demand improvements.

In another benefit, generators are loud and emit a readily detectable thermal signature. In the previously discussed military applications, such acoustic and/or thermal signatures can betray the team's location and compromise its security. In contrast, the battery 110 of the present embodiment of the invention operates with very little, if any, acoustic and/or thermal signature and can meet the team's energy and portable water needs without introducing unnecessary operational risks.

In yet another benefit, the exportable power capability of the present embodiment of the invention can meet localized power needs without the disadvantages of generators or similar devices. Returning to the military scenario, a current military challenge is "lightening the load", recognizing the fact that the typical soldier carries well over 100 pounds of gear with him/her on a given exercise. A significant portion of most soldiers' weight is represented by batteries. Given the challenges of accessing electricity in remote environments, most carried batteries are non-rechargeable and discarded once exhausted. The battery 110 provides a way to significantly decrease the amount of batteries a given soldier carries. Because of its energy exporting capability, the soldier can now carry the exact number of batteries required to operate his/her equipment and recharge the batteries as required, rather than carrying enough replacement batteries to complete a mission. This will reduce the amount of weight each soldier needs to carry (by as much as 15 pounds, increasing their effectiveness and decreasing fatigue and injury.

Figure 7:
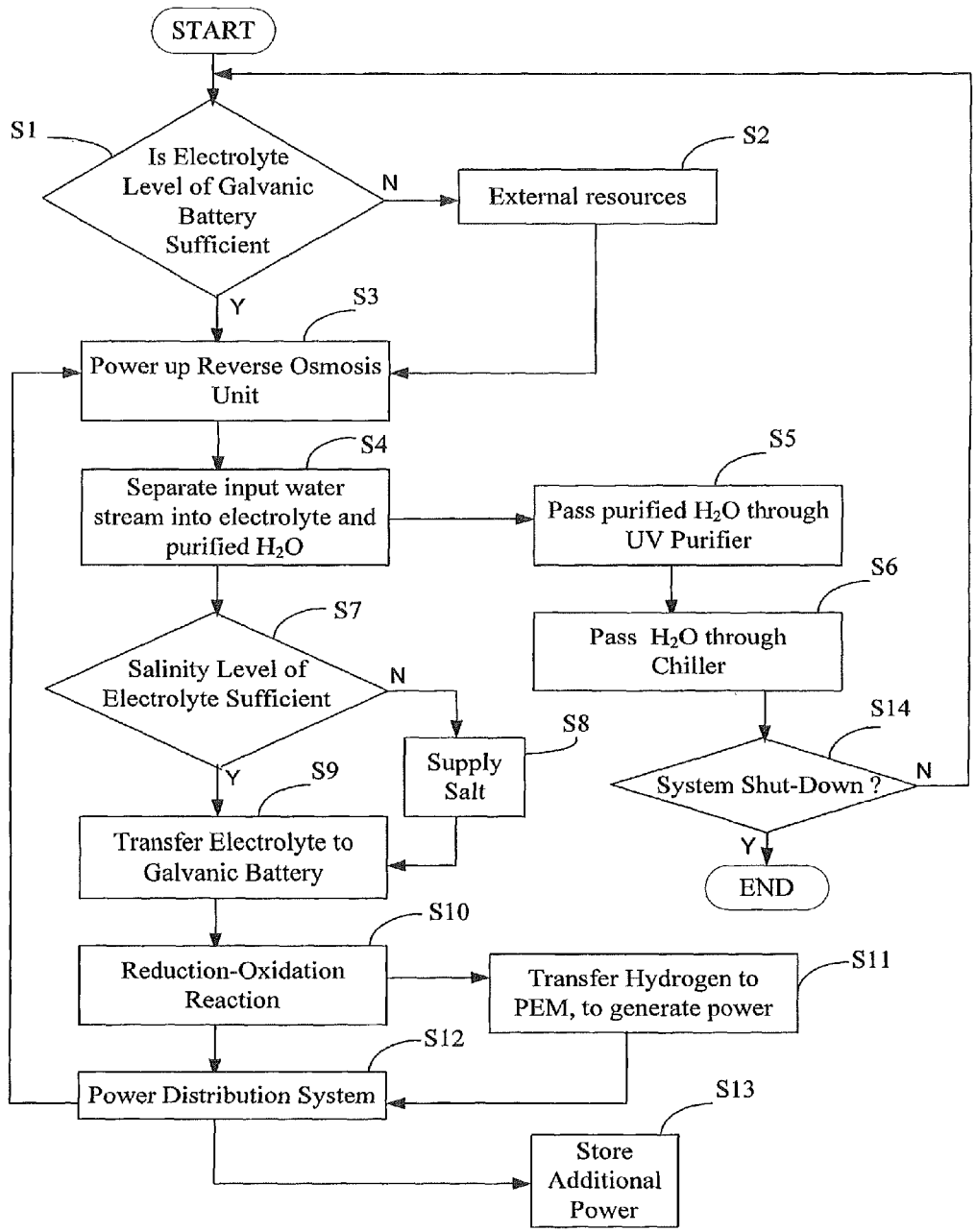
FIG. 7 is a flowchart depicting the steps performed by the water purification system that incorporates a self-sustained energy generating system.

FIG. 7 depicts a flowchart depicting the steps performed by the water purification system. In step SI, the controller queries to check if the galvanic battery is sufficiently immersed within the electrolyte to generate the required power that is to be supplied to the reverse osmosis unit. If the response to the query is affirmative, the process proceeds to step S3, where the reverse osmosis unit is supplied power by the power distribution system.

However, if the response to the query in step S1 is negative, the process proceeds to step S2, where external resources are utilized to power up the system. As stated previously, the power up process can be accomplished in multiple ways. One approach is to add brine solution (electrolytes) through the salt adding mechanism 108, in order to supply the required amount of electrolytes to the galvanic battery. Alternatively, stored power in the power storage unit 116 can be used to supply initial power required to activate the RO unit. Further, if external power sources are available (for example generators), the external power source could be connected to the system via the power interface 118 to supply the required power to the system.

Upon receiving the required power to function, the reverse osmosis unit 102, segregates the input water stream into electrolytic solution (waste materials) and purified water in step S4. The electrolyte solution is transferred from the RO unit to the salt adding mechanism, where the salinity level of the electrolyte is checked by the salinity monitor (step S7). As stated previously, certain galvanic batteries may require a minimum level of salinity in the electrolytes to generate energy. For example the MagC battery uses approximately 1-2% of salinity level in the electrolyte to generate energy. If the salinity level of the electrolyte is within a predetermined limit, the process proceeds to step S9 where upon the electrolyte is transferred from the salt adding mechanism to the galvanic battery. If the level of salinity is not sufficient, the salinity level of the electrolyte is increased by adding salt or other compounds via the salt adding mechanism (step S8).

In step S10, upon receiving the electrolytes, the galvanic battery initiates the reduction-oxidation (redox) reaction, which generates electrical energy which is transferred to the power distribution unit (step S12). If MagC batteries are used as the anode and cathode of the galvanic battery, hydrogen is a byproduct of the redox reaction. In step S11, the hydrogen gas emitted by the battery is transferred to a hydrogen fuel cell which is used to generate more energy. The total energy generated by the system is transferred to a power distribution unit in step S12, where a part of the energy is transferred to the reverse osmosis unit for processing and excess energy is stored in the power storage unit as shown in step S13.

The purified water stream generated at step S4 is passed through a UV purifier for further purification in step S5 and through a water chilling unit in step S6 to maintain the pure water at a certain desired temperature, such that the water is ready for consumption/use. Lastly, in step SI 4, a query is made (by the controller) to check if the system is to be powered off. If the response to the query is affirmative, the water purification system ends. Otherwise, the flow proceeds to step S1 to repeat the above described mechanism of water purification.

Figure 8:
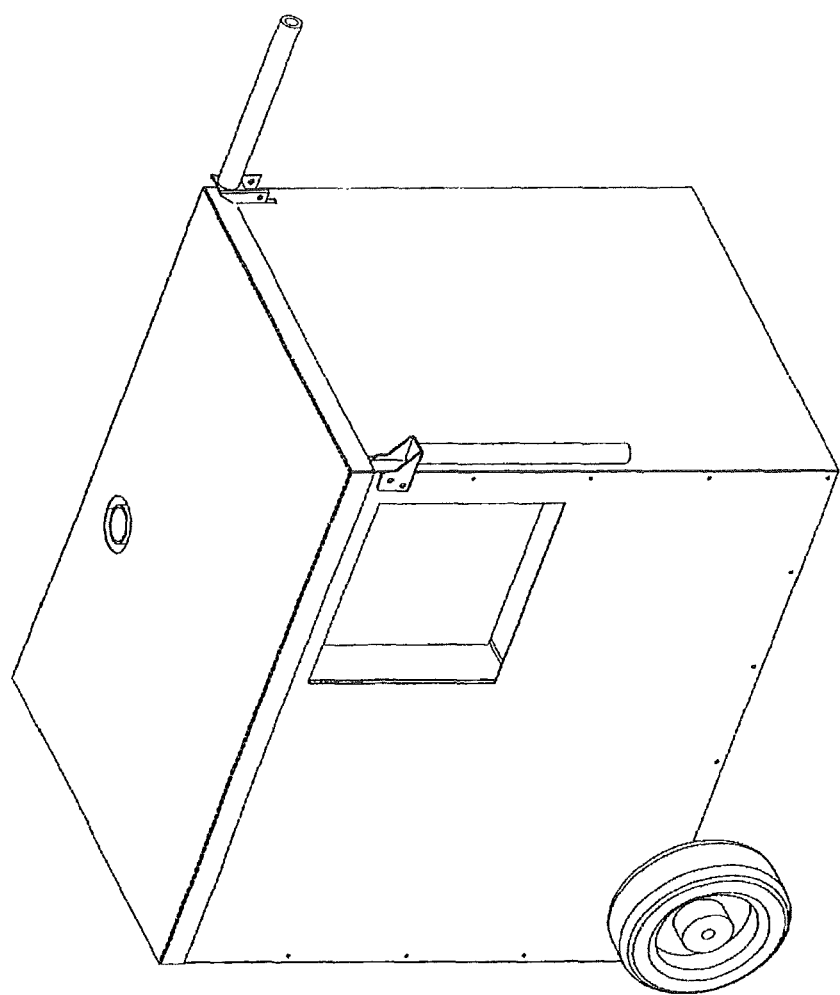
FIG. 8 depicts a configuration of an enclosure that houses the water purification system.

FIG. 8 shows an embodiment of the enclosure (casing) which houses the water purification system 100. One design for the housing the system is a wheelbarrow (cart) 18 configuration thereby easing the portability of the system. Remaining cognizant of the weight of the system and its applications in remote locations, the frame of the casing as well as the mounting plates that house the RO unit, the galvanic battery, the controller, PEM hydrogen fuel cell and other components of the system, may be made of aluminum or other suitable materials. The weight/mass of the unit is distributed evenly so that the center of gravity allows a user to easily move the system on wheels and a pair of handles, in a wheelbarrow type fashion. Other configurations could easily be used to realize the water purification system. For example, a case mounted (trailer) configuration could be used wherein briefcase type militarized cases can be used to house the individual components of the system, thereby providing a smaller scale light weight man portable system.

Figure 9:
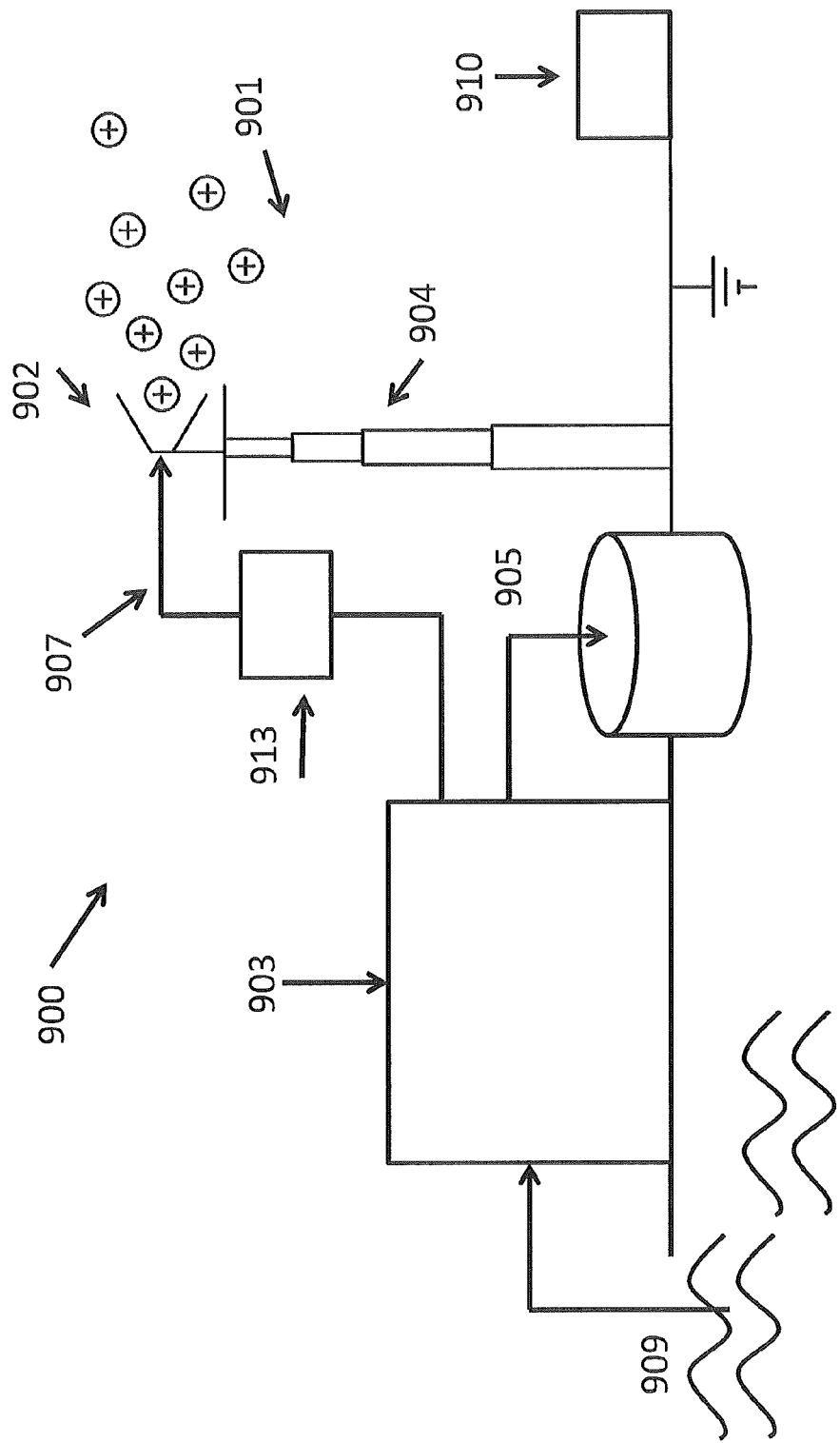
FIG. 9 is a schematic representation according to another embodiment of the disclosure including a water purification system integrating waste electrolyte into an electrolytic-driven energy generation system.

FIG. 9 depicts a schematic representation of according to another embodiment of the disclosure including a water purification system integrating waste electrolyte into an electrolytic-driven energy generation system. The embodiment depicted in FIG. 9 relates to energy generation systems and, particularly to energy generation systems using an electrolytic solution for generating energy. As will be understood by one skilled in the art, any of the components shown and described with respect to FIGS. 1-8 may be incorporated into the system shown in FIG. 9. Thus, a description of them will not be repeated herein.

As will be more fully described herein, the energy generation system of FIG. 9 overcomes disadvantages associated with conventional energy generation technology by requiring only an electrolyte to drive energy generation. In contrast, other technologies may require fossil fuels, renewable energy, batteries or similar devices/systems to drive energy generation. By eliminating the need for these sources, the embodiment of FIG. 9 provides an energy generation system able to meet energy needs in both remote and commercial scale environments which are otherwise ill-suited to the logistics demands other systems impose.

The water purification/energy generation system 900 of FIG. 9 will now be discussed in the context of a water purification system, with the energy generation system providing energy for water purification operations. However, it is to be appreciated that this discussion is intended to facilitate a more thorough understanding and illustration of the energy generation system, and should not be read as to circumscribe or otherwise limit its applicability. To the contrary, there are many contemplated applications for the energy generation system disclosed herein, not all of which include water purification.

In an exemplary application, the energy generation system 901 can be adapted for use in connection with a water purification system 903. As is known, water purification systems, especially those employing reverse osmosis (RO) units, usually require an energy source to drive the RO-based water purification. Further, as is also known, RO units receive an input water stream 909 to be processed, and output purified water 905 and a waste stream 907. In an embodiment of the present invention, the water purification system 903 can provide a waste stream 907 of an electrolytic solution necessary to operate the energy generation system 901. In turn, the energy generation system 901 may provide power to, or completely power, the water purification system 901, thus providing an advantage over conventional approaches requiring fossil fuel and/or renewable energy sources to power the water purification system 903.

If the input water stream 909 is an electrolytic solution, such as, for example, seawater, the waste stream 907 will also be electrolytic, such as, for example, a brine solution. This is because the electrolytic component will be removed during processing to produce purified water 905. Normally, this potentially pressurized waste stream is discarded. However, in accordance with the present invention, the energy generation system 901 is configured to translate this waste stream 907 into energy via the energy generation system 901, which energy in turn can be directed back to the RO unit 901 for continued operation.

The energy generation component 901 of FIG. 9 is adapted to leverage electro-hydrodynamic wind energy, electrokinetic wind generation, or any other power generation energy source (e.g., instead of a fossil fuel) that relies on a potentially infinite electrolyte source 907 to drive the energy generation component 901. The energy generation component 901 may be, for example, a wind and electrolytic energy generation device, such as that disclosed in U.S. Pat. No. 8,502,507, which is incorporated herein by reference. The wind and electrolytic energy generation device may operate by separating positively charged ions and negatively charged ions from the electrolytic waste stream 907 of the water purification system 903 and collecting the negatively charged ions or the positively charged ions. The separation of the ions may be accomplished using an electric field of a positive or negative polarity to exert an electromagnetic force on the positively or negatively charged ions according to the polarity of the electric field.

As shown in the example of FIG. 9, the energy generation system 901 may generally have two components, a collector or energy harvester component 902 and a height component 904. The height component 904 may be fixed or adjustable, which may be manually adjustable or electronically controlled. An adjustable height component 904 may be telescoping, or any other adjustment known to one of ordinary skill may be employed. The distance between the energy harvester 902 and ground may be controlled such that energy generation component 901 can change the magnitude of an electric field near the energy harvester 902 to provide for parameter changes that allow for energy extraction from the wind. In a preferred embodiment, the adjustable height component 904 may adjust the separation between the energy harvester 902 and ground until a predetermined performance metric is obtained. The metric may be, for example, a power threshold or a current threshold.

Furthermore, the height component 904 may be electrically nonconductive, or can be electrically insulated, such that current does not flow from the energy harvester 902 directly to ground. In a preferred embodiment, a central control unit (not shown) may control the adjustment of an adjustable height component 904 and the central control unit may control the rest of the energy generation system 901 and/or the entire water purification/energy generation system 900.

In one exemplary form as is known in the art, the energy generation system 901 can include an injector nozzle (not shown) which emits the electrolytic water stream into a wind stream, harvesting energy by using the wind to move electrically charged particles against a voltage gradient. The electrolyte water stream is pumped in, forcing a mist of tiny electrolyte droplets out nozzles located in a series of manifolds which make up each flat, wind permeable panel. The wind aids is separating the positive and negative charged particles and builds up an electric field that the wind continuously works against. The electrons that are left over on the panels are then harvested as a high voltage direct current. An array of these panels in conjunction with an electrolyte water stream and energy collector make up the energy harvesting system.

Additionally, depending on the configuration of the system, the energy generation system 901 may produce more energy than is required to drive the RO unit 903. In this case, the excess energy can be stored and/or exported for use by external devices. Thus, in an exemplary application, the present invention provides a self-contained system able to purify water, automatically generate the energy necessary for the water purification, and additionally generate excess energy that can be used to power external devices, all without necessarily relying on generators, fossil fuels and/or renewable energy sources.

As shown in FIG. 9, the water purification/energy generation system 900 preferably includes a reverse osmosis (RO) unit 903, a power generation system 901, and a power distribution system 910. In operation, the RO unit 903 draws in a water source 909, such as, for example, brackish water, seawater, or similar water. The RO unit 903 processes the water 909 and produces purified water 905 and a waste stream 907, and passes the waste stream 907 to the power generation system 901. The power generation system 901 could be any Electro-Hydrodynamic Wind Energy System, Electrokinetic Wind Generator, or any other electrolytic source driven system that produces energy. The power generation system produces the energy and transfers it to the power distribution system 910, which makes the energy available to the RO unit for continued operation. If excess energy is produced, the power distribution system can make the excess energy available to other devices. A discussion of each of the exemplary components of FIG. 9 follows.

The water purification system 903 can be any device capable of purifying water, including forward osmosis, charcoal, simple filtration, and the like. As is known, an RO device is a membrane technology-based filtration method that removes particles and other elements from solutions by applying pressure to the solution when it is one side of a selective membrane. The RO unit of the present invention can be variously combined with, or replaced by, other technologies as applications dictate, such as, for example, one or more sediment filters (optionally with varying pores sizes), activated carbon filters, ultra-violet (UV) lamps for disinfecting any microbes, sea water-specific elements, and so on. One skilled in the art will appreciate that the present invention is not limited to an RO water purification system.

It is to be understood that any solution exhibiting electrolytic properties can be used in connection with the present invention. For example, suitable solutions include, but are not limited to, salt water, brine, runoff, mineral water, urine, any Chloride (XCL), and so on.

Returning to FIG. 9, the system 900 may include a device 913 for adding salt or similar compound(s) to the waste stream 907. As previously described, the energy generation component 903 requires an electrolyte to operate. In the RO water purification system example, the electrolyte is provided by the waste from the RO unit. However, there are circumstances in which additional salt may be required. For example, if the system is deployed in a purely fresh water environment, the salt adder can generate the brine (electrolyte) otherwise not generated by the water purification unit 903. Also shown in FIG. 9, the system may also include a device(s) to measure the salt or electrolyte content of the waste stream 907 to determine how much, if any, salt should be added by the salt adder 913.

As should be clear from the foregoing discussion of the example water purification/energy generation system, the inventive system 900 offers significant benefits over conventional water purification and/or energy generation technology. Conventional power plants and generators have several disadvantages. For example, one of the main disadvantages is that they require fossil fuels to operate. This requires the user(s) to transport sufficient amounts of fuel to operate the generator. In the event the generator is at a remote location, this can significantly increase the logistics and environmental burden on the unit. Additionally, fossil fuel is expensive, non-renewable and otherwise problematic. In contrast, the system of the present invention is adapted to leverage electro-hydrodynamic wind energy, electrokinetic wind generation, or any other power generation energy source (instead of a fossil fuel), and rely on a potentially vast possibly high pressure electrolyte to drive the power system. This provides significant environmental, cost and logistics demand improvements.

While certain embodiments have been described, these embodiments have been presented by way of example only, and are not intended to limit the scope of the present invention. Indeed, the novel methods and systems described herein may be embodied in a variety of other forms; furthermore, various omissions, substitutions, and changes in the form of the methods and systems described herein may be made without departing from the spirit and scope of the present invention. The accompanying claims and their equivalents are intended to cover such forms or modifications as would fall within the scope and spirit of the present invention.

Further, while the present invention has described herein with particular reference to the drawings, it should be understood that various modifications could be made without departing from the spirit and scope of the present invention. Those skilled in the art will appreciate that various other modifications and alterations could be developed in light of the overall teachings of the disclosure. The presently preferred embodiments described herein are meant to be illustrative only and not limiting as to the scope of the invention which is to be given the full breadth of the appended claims and any and all equivalents thereof. Additionally, the disclosure of a range of values is a disclosure of every numerical value within that range.

We claim:

1. A system for converting a waste stream to energy comprising:
    a water purification device that outputs purified water and a waste stream, the waste stream including an electrolyte;
    a wind and electrolytic energy generation device that receives the waste stream from the water purification device, wherein the wind and electrolytic energy generation device comprises a means to emit the waste stream into a wind stream, wherein the wind and electrolytic energy generation device outputs energy based on the electrolyte present in the waste stream; and
    a power distribution system which receives and stores the energy from the wind and electrolytic energy generation device; and
    wherein the water purification device is further connected to the power distribution system and receives energy enabling further operation of the water purification device.

2. The system of claim 1, wherein the wind and electrolytic energy generation device separates positively charged ions and negatively charged ions from the waste stream and collects at least one of the negatively charged ions and the positively charged ions.

3. The system of claim 1, further comprising:
    a salinity monitor configured to measure a salinity of the waste stream.

4. The system of claim 1 further comprising:
    a salt adding device configured to produce a saline electrolyte solution of a predetermined salinity.

5. The system of claim 1, wherein the wind and electrolytic energy generation device comprises a collector and an adjustable height component.

6. The system of claim 1, further comprising:
an ultraviolet purifier configured to perform bacterial purification; and
a chiller unit configured to maintain the purified water at a predetermined temperature.

7. The system of claim 1, further comprising:
an external power interface configured to connect the system to an external power source for drawing energy into the system.

8. The system of claim 1, further comprising:
a pump device configured to circulate the electrolyte generated by at least one of the water purification device and a salt adding device through the wind and electrolytic energy generation device.

9. The system of claim 1, wherein the wind and electrolytic energy generation device separates positively charged ions and negatively charged ions from the waste stream via an electrical field.

10. A method for converting a waste stream to energy comprising:
receiving a water source by a water purification device;
outputting, by the water purification device, purified water and a waste stream, the waste stream including an electrolyte;
receiving, by a wind and electrolytic energy generation device, the waste stream from the water purification device;
emitting the waste stream into a wind stream;
generating energy, by the wind and electrolytic energy generation device, based on the electrolyte present in the waste stream;
receiving the energy from the wind and electrolytic energy generation device by a power distribution system; and
storing energy generated by the wind and electrolytic energy generation device by the power distribution system; and
wherein the water purification device is further connected to the power distribution system and receives energy enabling further operation of the water purification device.

11. The method of claim 10, wherein the wind and electrolytic energy generation device separates positively charged ions and negatively charged ions from the waste stream and collects at least one of the negatively charged ions and the positively charged ions.

12. The method of claim 10, wherein the wind and electrolytic energy generation device comprises a collector and an adjustable height component.

13. The method of claim 10, wherein the wind and electrolytic energy generation device generating energy comprises the wind and electrolytic energy generation device separating positively charged ions and negatively charged ions from the waste stream via an electrical field.

14. The method of claim 10, further comprising measuring a salinity of the waste stream by a salinity monitor.

* * * * *